United States Patent [19]
Knapick

[11] Patent Number: 6,101,754
[45] Date of Patent: Aug. 15, 2000

[54] HUNTING LURE

[76] Inventor: William Knapick, 1453 W. Pine St., Coal Township, Pa. 17866

[21] Appl. No.: 08/846,258

[22] Filed: Apr. 30, 1997

[51] Int. Cl.[7] .................................................. A01M 31/00
[52] U.S. Cl. .............................................. 43/1; 242/404.3
[58] Field of Search ................................. 43/1; 206/419, 206/315.11; 222/187; 239/55, 52, 53; 242/223, 225, 405, 404.1, 404.3, 397.1, 400; 446/361; 119/708, 702

[56]  References Cited

U.S. PATENT DOCUMENTS

| | | | |
|---|---|---|---|
| 2,246,965 | 6/1941 | Yoder | 119/711 |
| 3,727,583 | 4/1973 | Muraro | 119/711 |
| 3,901,076 | 8/1975 | Grayson | 73/184 |
| 4,682,715 | 7/1987 | Reeves | 222/175 |
| 4,722,477 | 2/1988 | Floyd | 239/36 |
| 4,735,010 | 4/1988 | Grinarml | 43/1 |
| 4,739,944 | 4/1988 | Atwell | 424/84.1 |
| 4,771,563 | 9/1988 | Easley | 43/1 |
| 4,788,787 | 12/1988 | Lonietzki | 43/1 |
| 5,074,439 | 12/1991 | Wilcox | 222/175 |
| 5,161,646 | 11/1992 | Aurich et al. | 222/187 |
| 5,388,877 | 2/1995 | Wenk | 294/1.1 |
| 5,461,814 | 10/1995 | Reid et al. | 43/1 |

*Primary Examiner*—Peter M. Poon
*Assistant Examiner*—Son T. Nguyen

[57] ABSTRACT

A lure is shown for attracting game and the like. It is taken up when not in use by mechanical or automatic devices and stored in a substantially air tight area.

2 Claims, 1 Drawing Sheet

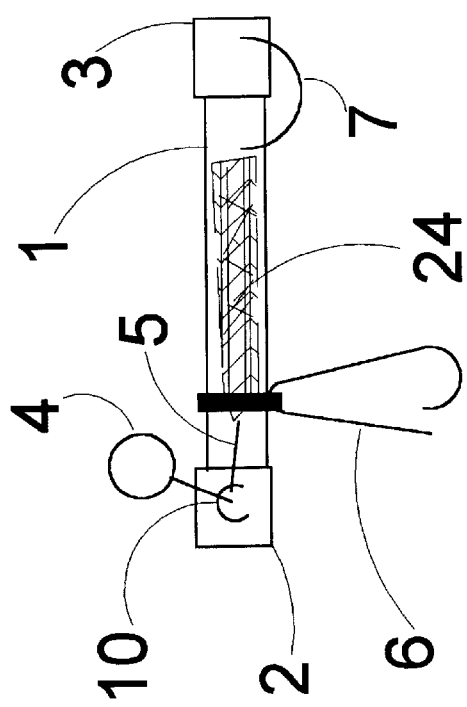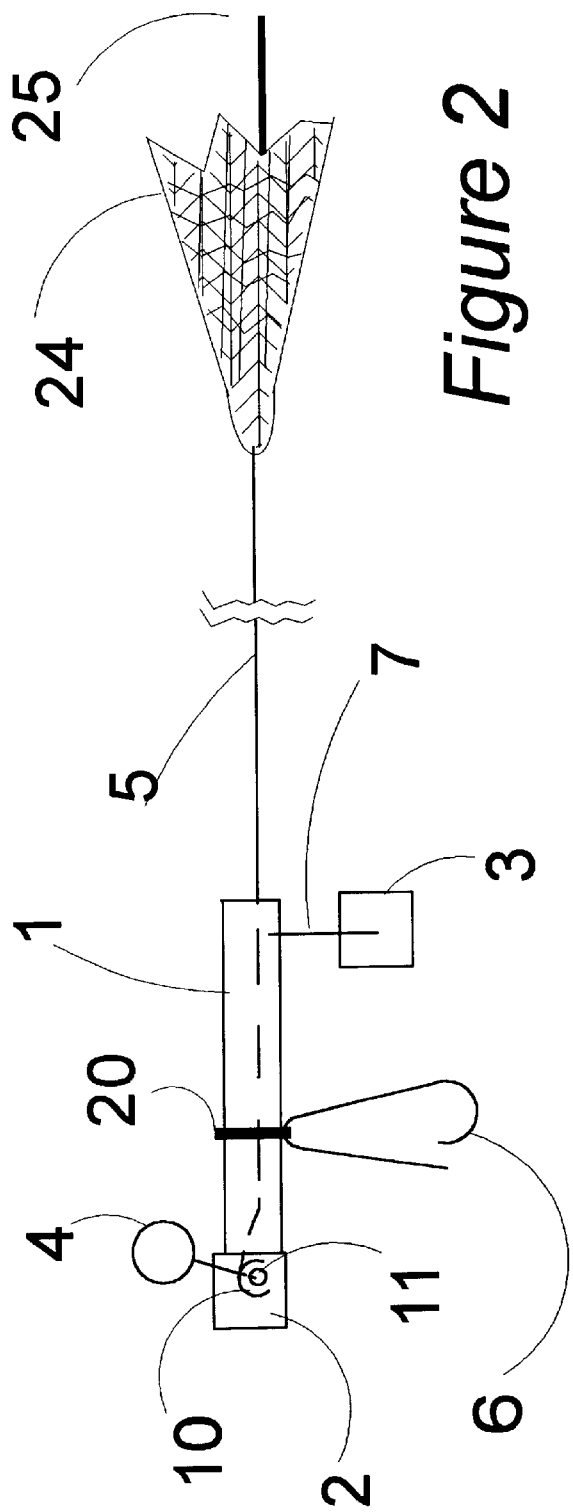

HUNTING LURE

BACKGROUND OF THE INVENTION

This invention relates to apparatus and methods used regarding lures in hunting. More particularly, it relates to lures, of the type known as drag lures or drags, used to lay a trail in order to attract game to where a hunter lies in wait.

The use of lures in hunting is of course known in the art. Scent lures are used to lay down a particular attractant scent. Often they are dragged to a stand where the hunter may lie in wait for game to appear. Thus they may be known as a drag lure or drag. The type of scent used on the drag varies according to the game desired to be attracted to the hunter. One complication is the need to lay scent as well as ensure that the hunter's own scent is not perceived by the game, thus possibly scaring the game away. Thus, there is a class of prior art which involves attaching a drag to a hunter's shoe and which hopefully serves to cover up the hunter's own scent as well as laying a scent attractive to game, and one which the game would be inclined to follow. Another class of art dispenses the lure attractant from a string or other device soaked in the scent. The string or other device is trailed behind the hunter and serves to both lay a scent trial and hopefully cover the hunter's own scent.

The problems with the prior art are due to the nature of scent. The application of scent to the drag, the trailing of the drag behind the hunter, and the subsequent retention of the drag by the hunter all mean the hunter may become covered with the scent—a desirable notion from the hunting point of view perhaps, but less desirable when the hunt is concluded and ordinary life must be resumed. Furthermore, there does not appear to be any neat method of laying out the drag and retrieving the drag after use, so that the hunter may easily travel from site to site for example.

Accordingly, it is an object of the present invention to provide for a lure retaining device that allows some isolation of the hunter from the lure.

It is a further object of the present invention to provide for a lure retrieval device that quickly and easily stores the lure in a convenient storage container.

SUMMARY OF THE INVENTION

The present invention comprises a drag lure, a storage place for the drag lure, a connection between the drag lure and the storage place, and a retrieval mechanism for the drag lure. In a preferred embodiment, the drag lure is connected to the retrieval mechanism by way of ordinary cotton or nylon string. The retrieval mechanism permits the drag lure to be retrieved automatically and stored within a tube. The drag lure may then be pulled out and used or reused.

BRIEF DESCRIPTION OF THE DRAWINGS

FIG. 1 shows a preferred embodiment of the present invention.

FIG. 2 shows another view of the embodiment of FIG. 1.

DETAILED DESCRIPTION OF THE PREFERRED EMBODIMENTS

In FIG. 1 a preferred embodiment of the present invention is shown. The storage unit in this embodiment is the tube 1, made of polyvinyl chloride (PVC), although any material known in the art can be used in other embodiments. Each cap, 2 and 3, also made of PVC or other materials known in the art, fits snugly so that a practically airtight seal is formed by the placement of the caps 2 and 3 on the tube 1. The caps fit, in this embodiment, through a friction fit. In other embodiments, other practically airtight seals as known in the art may be used, for example using rubber seals to secure the connection between the caps and tube. Stored inside the tube 1 and seen in the cutaway are line 5 and drag lure 24. Pull 25 is also stored in the tube, but not shown in FIG. 1. Reel 10 is mounted within cap 2. Clip 6 which may be any sort of clip known in the art sufficient to store the device upon the hunter's clothing or equipment, is retained upon the tube 1 by band 20, which is made of rubber. Chain 7 is used to retain cap 3 on the tube 1, as described below with regard to FIG. 2.

Turing now to FIG. 2, again is seen cap 2 with reel 10 set inside via axle 11. Reel 10 is rotatable via crank 4 so that line 5 can be taken up on the reel 10, in manner known in the art. One end of line 5 is set in the reel 10, the other end is fixed to drag lure 24 and pull 25. It may be desirable, in another embodiment, to fasten the drag to the line with a snap fit, so that drag lure 24 may be changed with another. Moreover, a spinning or pivoting mechanism may be used as well, or in combination with the snap fit, so that the line does not become tangled as it accommodates the movement of drag lure 24.

Drag 24 lure is comprised of cloth or other material sufficient to retain scent. It is soaked in a lure scent, which is a known type such as Tink's 69, Trails End, H. S. Scents, Keller's Ambush and the like. This provides a scent trail to lure the game as the drag is being used. Various scents such as the above or others known in the art may be used, such as apple or acorn or some other scent attractant.

In operation, cap 3 is removed from the end of the tube 1 and pull 25 is used to pull the drag lure 24 out from the tube 1. In this embodiment cap 3 is retained to the tube I by way of chain 7 to ensure it is not lost. The drag lure 24 may have been previously treated with scent or may be treated or retreated now. Line 5 is pulled out to its furthermost extension on reel 10 so that no further line remains on reel 10. In this embodiment, the line 5 is comprised of cotton string commonly available, which is also soaked in scent, although any material known in the art may of course be used in other embodiments. Line 5 is about 5 feet long in this embodiment, although the length may vary and be determined by any number of factors. Clearly the line should be of length adequate to allow the drag lure 24 to at least reach the ground when the embodiment is being carried and dragged by the hunter.

When the hunter is done with the drag lure which may be when the stand is reached or may be at the end of the day, the drag lure 24 is retracted using crank 4 to pull the drag lure back into the tube 1 through line 5 being taken up. The hunter does not have to touch the drag lure if it is not desired to, and thus may keep him or herself scent free. Once the drag lure 24 is stored back in the tube 1 after the line 5 has reel 10, the tube 1 may be recapped with cap 3 and the drag lure preserved for the next use. It may at any time be clipped to the hunter's clothing or equipment using clip 6.

Other embodiments are possible. The use of an automatic take-up rather than a manual take-up such as a motorized or spring and ratchet take-up is possible, for example. Additionally a manual pull type take-tip where the hunter serves as the mechanism, pulling the drag lure up and wrapping the string around the outside of the device for storage, may be used. The entire device could then be placed in a plastic bag or some other reasonably airtight storage mechanism in case the line has been treated with the scent.

Another embodiment might have a recloseable hole placed therein for the scent to be poured into the tube, if the hunter desires to scent the drag lure and possibly the string in that manner, although it is envisioned in most embodiments the scent may simply be poured into the tube to scent the drag lure. Paste or other type scents may be used, which will be applied as known in the art.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

What is claimed is:

1. A lure for use in hunting comprising:

a drag lure;

a tube for retaining said drag lure, having a first removable cap at a first end, and a second removable cap at a second end;

a reel rotatably attached to said first end of said tube;

a crank attached to said reel for rotative operation of said reel;

a connection means with two ends, one of said ends is attached to said drag lure, with the other end being attached to said reel, so that when said reel is operated by way of said crank, said drag lure, will be brought towards and inside said tube by way of said connective means.

2. A lure for use in hunting comprising:

a drag lure;

a tube for retaining said drag lure, having a first removable cap at a first end, and a second removable cap at a second end;

a reel rotatably attached to first removable cap;

a crank attached to said reel for operation of said reel;

a connection means with two ends, one of said ends is attached to said drag lure, with the other end being attached to said reel, so that when said reel is operated by way of said crank, said drag lure, will be brought towards and inside said tube by way of said connective means.

* * * * *